United States Patent [19]

Chan et al.

[11] Patent Number: 4,606,490

[45] Date of Patent: Aug. 19, 1986

[54] APPARATUS AND METHOD FOR AUTOMATIC EVALUATION OF A BOND CREATED BY AN ULTRASONIC TRANSDUCER

[75] Inventors: Lo Kwan Chan; Heico J. Frima, both of Hong Kong, Hong Kong

[73] Assignee: ASM Assembly Automation Limited, Kowloon, Hong Kong

[21] Appl. No.: 410,944

[22] Filed: Aug. 24, 1982

[51] Int. Cl.⁴ .............................................. B23K 21/02
[52] U.S. Cl. .................................... 228/103; 228/110; 228/1.1; 364/477
[58] Field of Search .................... 228/102, 103, 110, 1, 228/8; 364/477, 483, 487

[56] References Cited

U.S. PATENT DOCUMENTS

| | | | |
|---|---|---|---|
| 3,158,928 | 12/1964 | De Prisco et al. | 228/102 |
| 3,302,277 | 2/1967 | Pruden et al. | 228/110 X |
| 3,734,382 | 5/1973 | Spanjer | 228/1 |
| 3,784,079 | 1/1974 | Spanjer | 228/1 |
| 3,794,236 | 2/1974 | Salzer et al. | 228/1 |
| 3,827,619 | 8/1974 | Cusick et al. | 228/1 |
| 4,024,371 | 5/1977 | Drake | 364/477 X |
| 4,024,522 | 5/1977 | Clark et al. | 228/103 X |
| 4,047,657 | 9/1977 | Mims | 228/1 X |
| 4,067,490 | 1/1978 | Jones et al. | 228/102 |
| 4,341,574 | 7/1982 | Landes | 228/110 X |
| 4,373,653 | 2/1983 | Salzer et al. | 228/1 X |
| 4,409,659 | 10/1983 | Devine | 228/110 X |

FOREIGN PATENT DOCUMENTS

| | | | |
|---|---|---|---|
| 46636 | 3/1982 | European Pat. Off. | 228/103 |
| 142647 | 11/1981 | Japan | 228/102 |
| 740444 | 6/1980 | U.S.S.R. | 228/102 |

OTHER PUBLICATIONS

*Automatic Welding*, (Great Britain), vol. 34, No. 5, May 1981, pp. 31-33, Kozich et al., "An Analysis of Systems for the Active Inspection of Ultrasonic Micro-Welded Joints".

*Primary Examiner*—Nicholas P. Godici
*Assistant Examiner*—M. Jordan
*Attorney, Agent, or Firm*—Harry M. Weiss & Associates

[57] ABSTRACT

Apparatus and method for determining if a lead bond created by an ultrasonic transducer has the characteristics of a good bond. The current supplied to the transducer is monitored and the envelope of the supplied current is sampled periodically and supplied to a computing means. The computing means compares selected characteristics of the sampled signal with characteristics previously determined to create good lead bonding. The results of this comparison are stored in a bond quality control data processing system and supplied to a host data processing system. The host data processing system can take appropriate action. The bond quality control data processing system can control the power supplied to the ultrasonic transducer to provide better characteristics.

5 Claims, 6 Drawing Figures

APPARATUS AND METHOD FOR AUTOMATIC EVALUATION OF A BOND CREATED BY AN ULTRASONIC TRANSDUCER

BACKGROUND OF THE INVENTION

1. Field of the Invention

This invention relates generally to the use of ultrasonic bonding apparatus and, more particularly, to the automatic evaluation of the bond created by the ultrasonic bonding apparatus.

2. Description of the Prior Art

It is known in the prior art to utilize ultrasonic bonding apparatus under control of data processing apparatus to provide automatic lead bonding. However the problem has remained that much of the benefit of the automatic bonding apparatus is lost if it is still necessary to provide an operator to determine if the bond formed by the automatic operation is satisfactory.

A need was therefore felt for apparatus for an evaluation of a bond created by ultrasonic bonding apparatus which did not involve the presence of an operator.

SUMMARY OF THE INVENTION

It is therefore an object of the present invention to provide an improved ultrasonic bonding apparatus.

It is a further object of the present invention to provide apparatus for automatically testing of the quality of a lead bonding procedure.

It is a further object of the present invention to provide apparatus for monitoring current supplied to a piezoelectric ultrasonic transducer during a bonding operation, characteristics of the profile of the actual current being compared with desired or expected characteristics.

It is yet another object of the present invention to provide apparatus capable of detecting a defective bonding operation without the presence of an operator.

The aforementioned and other objects are accomplished, according to the present invention, by apparatus for monitoring the profile of current supplied to the piezoelectric transducer performing the bonding operation. The characteristics of the monitored current are then compared with characteristics of current expected to determine when the bonding operation is successfully performed. A data processing unit dedicated to monitoring the bonding operation stores status signals identifying when the monitored current falls outside of the predetermined characteristics. The status signals can on command be transferred to a host processing system for appropriate action. The dedicated data processing unit can also control the power applied to the transducer when such a variation can provide improvement in the characteristics.

The foregoing and other objects, features, and advantages will be apparent from the following, more particular description of the preferred embodiment of the invention, as illustrated in the accompanying drawings.

DESCRIPTION OF THE PREFERRED EMBODIMENTS

Detailed Description of the Drawings

Referring now to FIG. 1, the envelopes of the transducer current for several bonding conditions are shown. FIG. 1a is an example of an envelope of a transducer current resulting in a good bond. The wire does not adhere immediately so the envelope of the bolding transducer current rises to a maximum value. As the wire begins to adhere, the transducer motion will be restricted and the envelope decreases.

Figure 1A:
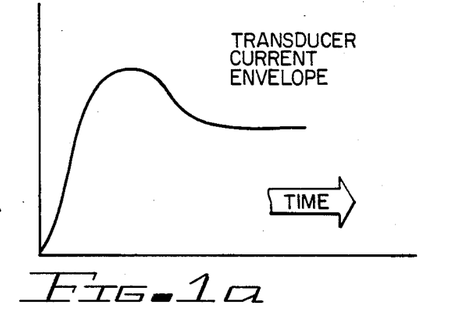
FIG. 1 demonstrates several transducer current envelope curves resulting from several conditions.
Figure 1B:
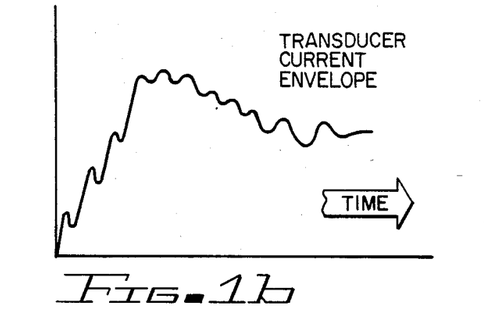
Figure 1C:
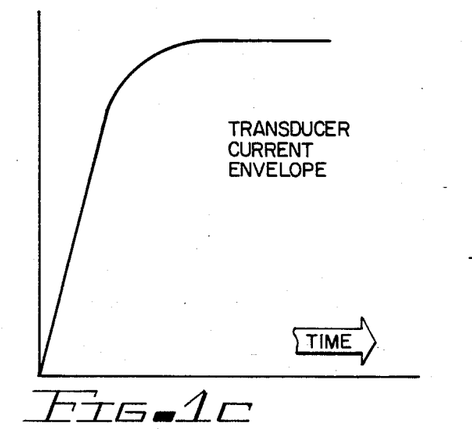
Figure 1D:
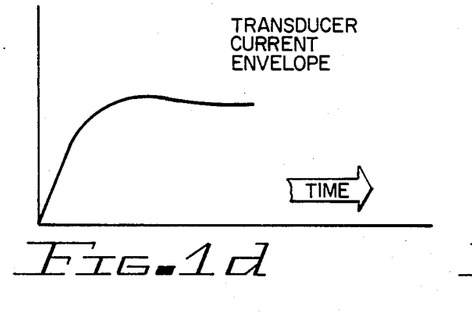
Figure 1E:
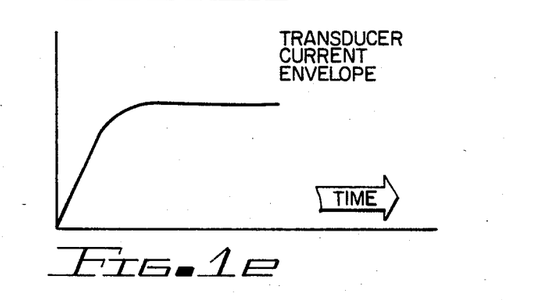
Figure 1F:
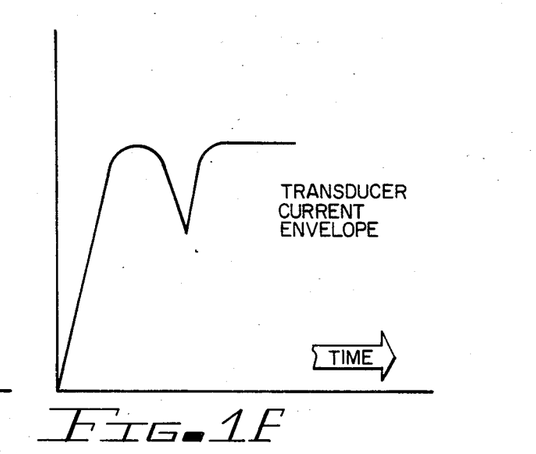

FIG. 1b indicates the envelope of the transducer current when vibrations in the mechanical system are present. The vibrations cause the force of the bonding wedge to fluctuate and the variations will be reflected in transducer current. FIG. 1c shows an envelope of bonding current when the bonding wedge is not in contact with an object, while FIG. 1d shows an envelope of a transducer bonding current when the bonding wedge is resting on the substrate without a wire. FIG. 1e shows the envelope of the transducer current when the transducer power is too low, and FIG. 1f shows the envelope of the transducer current when the power is too large, causing the bond to rupture.

Figure 2:
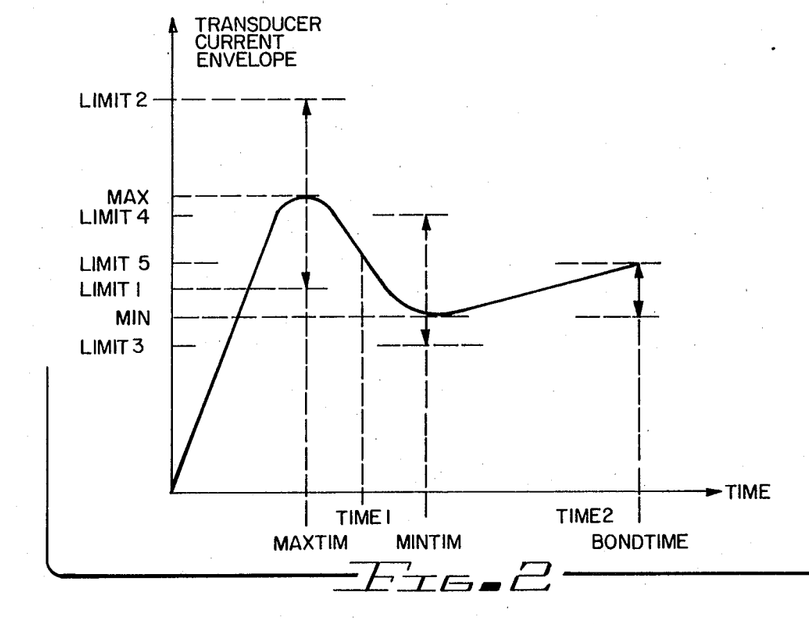
FIG. 2 demonstrates a transducer current envelope curve resulting from a satisfactory lead bonding operation. Several paramenters are also demonstrated.

Referring to FIG. 2, parameters defining a transducer current envelope that produces a bond of satisfactory quality are shown. The envelope of the transducer current rises to a maximum or MAX value at a time defined as MAXTIM. The envelope then falls to a relative minimum defined as MIN occurring at a time MINTIM. The current envelope rise until the bonding operation is complete at a time defined as BONDTIME. The parameters LIMIT 1, LIMIT 2, LIMIT 3, LIMIT 4, LIMIT 5. TIME 1 and TIME 2 will be defined below.

Figure 3:
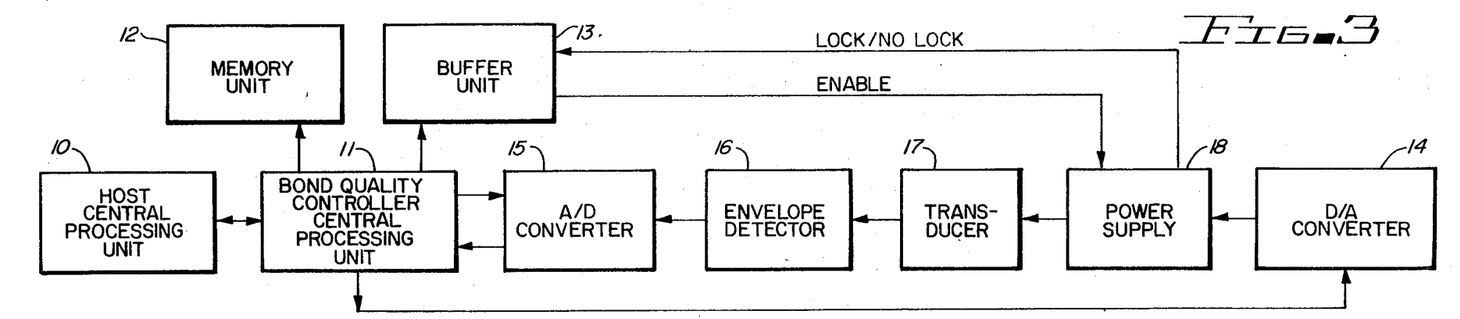
FIG. 3 is a schematic block diagram of the bond quality control apparatus according to the present invention.

Referring to FIG. 3, host central processing unit 10 is coupled to control central processing unit 11. Control central processing unit 11 is coupled to memory unit 12, to buffer unit 13 and to D/A Converter 14. Buffer unit 13 and D/A converter 14 are coupled to power supply 18. Power supply 18 is coupled to transducer 17.

The transducer 17 is an aluminum alloy 70 PTL piezoelectric bond horn, manufactured by U.T.I. with a ¾" bonding wedge. The transducer receives, power from a U.T.I. 10-E power supply 18 using a 6H6 "fast frequency" module for fast response. Transducer 17 is coupled to envelope detector 16. Envelope detector 16 is coupled to A/D converter 15, and A/D converter 15 is coupled to control central processing unit 11. In the preferred embodiment host central processing unit 10 can be a 6809 microprocessor, while control central processing unit 11 can be a 68121 microprocessor. Memory unit 12 can be a 2716 EPROM, A/D converter 15 can be 0804 component, D/A converter 14 can be a AD558 component and buffer unit 13 can be a LS645 component.

Figure 4A:
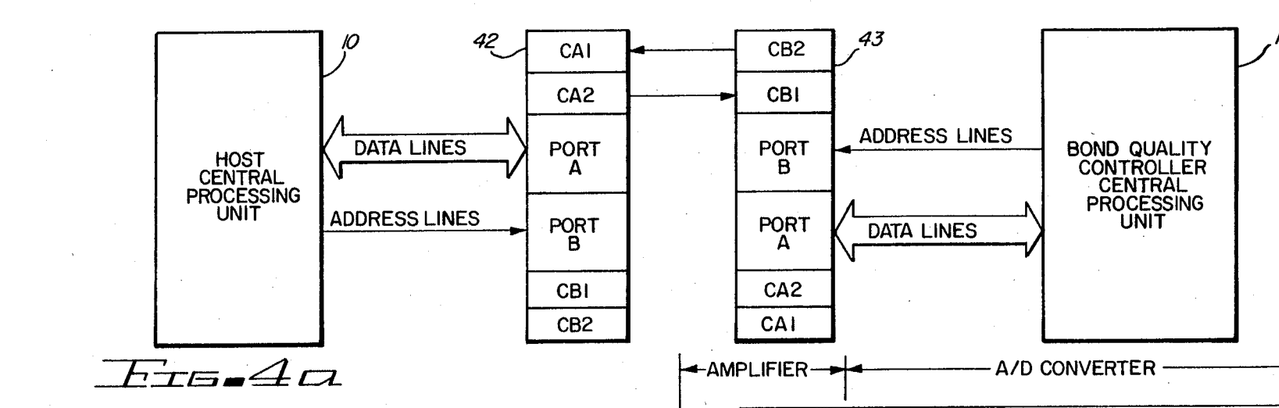
FIG. 4 is a schematic block diagram and a timing diagram for the communication between the host central processing unit and the bond quality controller central processing unit.
Figure 4B:
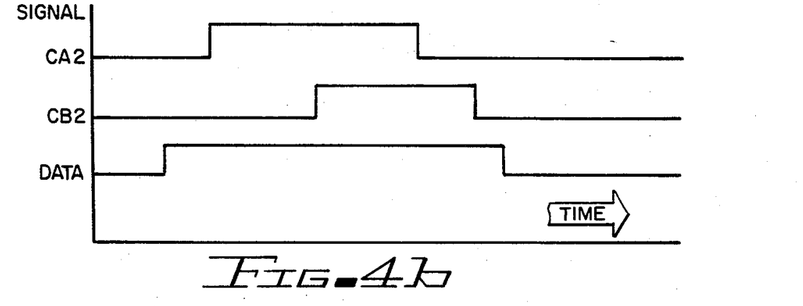

Referring next to FIG. 4a and FIG. 4b, the host central processing unit 10 is coupled to peripheral interface adapter (PIA) unit 42. The address lines of host central processing unit 10 are coupled to port B of PIA 42 while the data lines are coupled to port A of the PIA 42. PIA 42 is coupled to peripheral interface adapter (PIA) unit 43. Port A of PIA 42 is coupled to Port B of PIA 43. Port B of PIA 42 is coupled to Port A of PIA 43. Control bit CA1 of PIA 42 is coupled to control bit CB2 of PIA 43, while control bit CA2 of PIA 42 is coupled to control bit CB1 of PIA 43. Bond quality controller contral processing unit 11 is coupled to PIA 43. The address lines from bond quality controller central processing unit 11 are coupled to Port B of PIA 43 while the data lines are coupled to port A of PIA 43. The relative timing of the control bit CA2 of PIA 42 and the central bit CB2 of PIA 43 and the data signals are shown in FIG. 4b.

Figure 5:
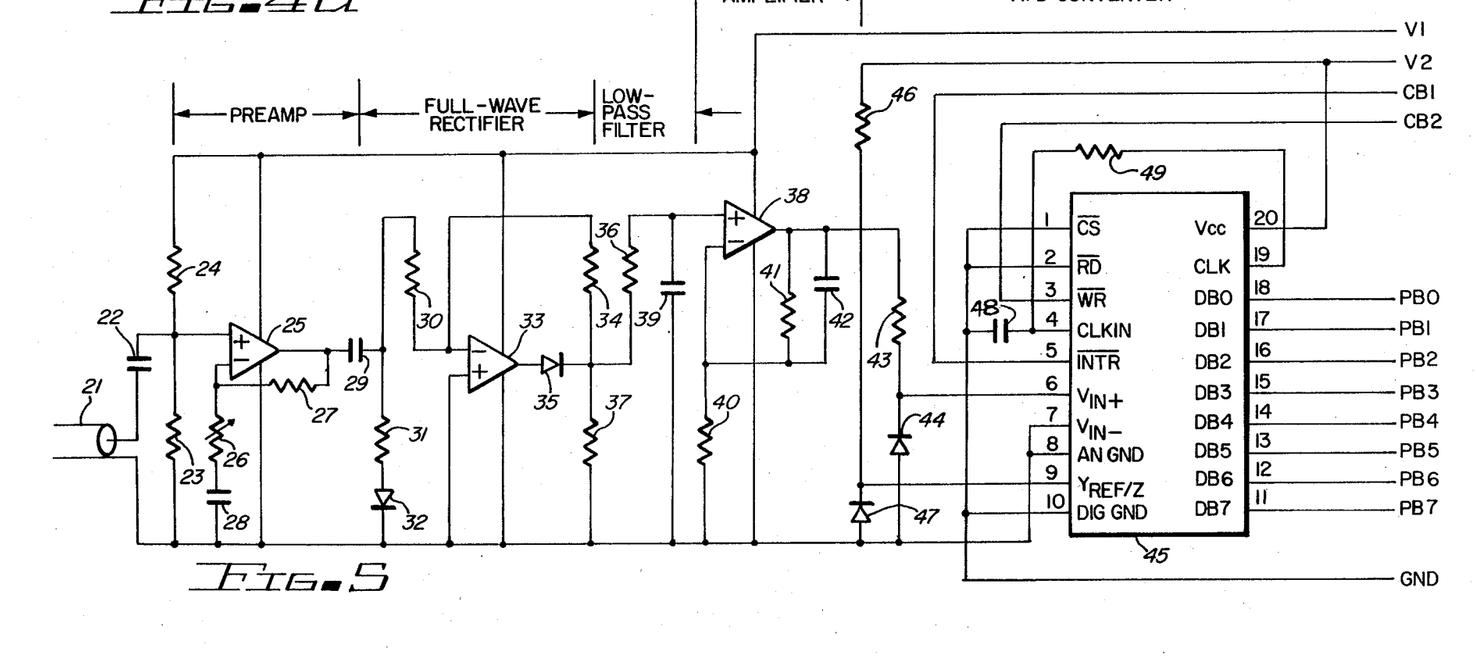
FIG. 5 is a schematic block diagram of the apparatus for producing a signal related to the envelope of the transducer current during the bonding operation.

Referring next to FIG. 5, the inner conductor of coaxial cable 21 is coupled to one terminal of 0.01 uf capacitor 22. The external conductor of coaxial conductor 21 is coupled to a common conductor. The second terminal of capacitor 22 is coupled through 100K resistor 23 to the common conductor, through 150K resistor 24 to a (12 volt) power supply $V_1$, and to a positive input terminal of CA3140B operational amplifier 25. A negative input terminal of operational amplifier 25 is coupled to one terminal of variable 10K resistor 26 and to one terminal of 39K resistor 27. A second terminal of resistor 27 is connected to capacitor 28. The output of the operational amplifier 25 is coupled to a second terminal of resistor 27 and to a first terminal of 0.1 uf capacitor 29. A second terminal of capacitor 29 is coupled to a first terminal of 10K resistor 30 and to a first terminal of 15K resistor 31. A second terminal of resistor 31 is coupled to a positive terminal of IN60 diode 32. A negative terminal of diode 32 is coupled to the common conductor. A second terminal of resistor 30 is coupled to a negative input terminal of CA3140B operational amplifier 33 and one terminal of 5K resistor 34. A positive input terminal of operational amplifier 33 is coupled to the common conductor. An output terminal of operational amplifier 33 is coupled to a positive terminal of IN60 diode 35. A negative terminal of diode 35 is coupled to a second terminal of resistor 34, a first terminal of 100K resistor 36, and through 15K resistor 37 to the common conductor. The second terminal of resistor 36 is coupled to a positive input terminal of a CA3140B operational amplifier 38 and through 3.3 nf capacitor 39 to the common conductor. A negative input terminal of operational amplifier 38 is coupled through 15K resistor 40 to the common conductor, to one terminal of 33K resistor 41 and to one terminal of 1 nf capacitor 42. An output terminal of operational amplifier 38 is coupled to a second terminal of resistor 41, a second terminal of capacitor 42, and a first terminal of 1K resistor 43. A second terminal of resistor 43 is coupled to a negative terminal of LM751 zener diode 44 and to terminal 6 of an 0804 A/D converter 45. A positive terminal of diode 44 is coupled to the common conductor. The common conductor is coupled to terminals 7 and 8 of A/D converter 45. A second (5 volt) power supply V2 is coupled to terminal 20, a first terminal of 33K resistor 46. A second terminal of resistor 46 is coupled to terminal 9 of A/D converter 45 and to a negative terminal of LM336 zener diode 47. The positive terminal of zener dioder 47 is coupled to the common conductor. External signals applied to terminal 3 and to terminal 5 of A/D converter 45. A ground connection is coupled to terminal 10, terminal 2 and terminal 1 of and through 150 pf capacitor 48 to terminal 4 of A/D converter 45. Terminal 4 is coupled through 10K resistor 49 to terminal 19 of A/D converter 45. Terminals 11 through 18 provide the output signals from A/D converter 45.

Figure 6A:
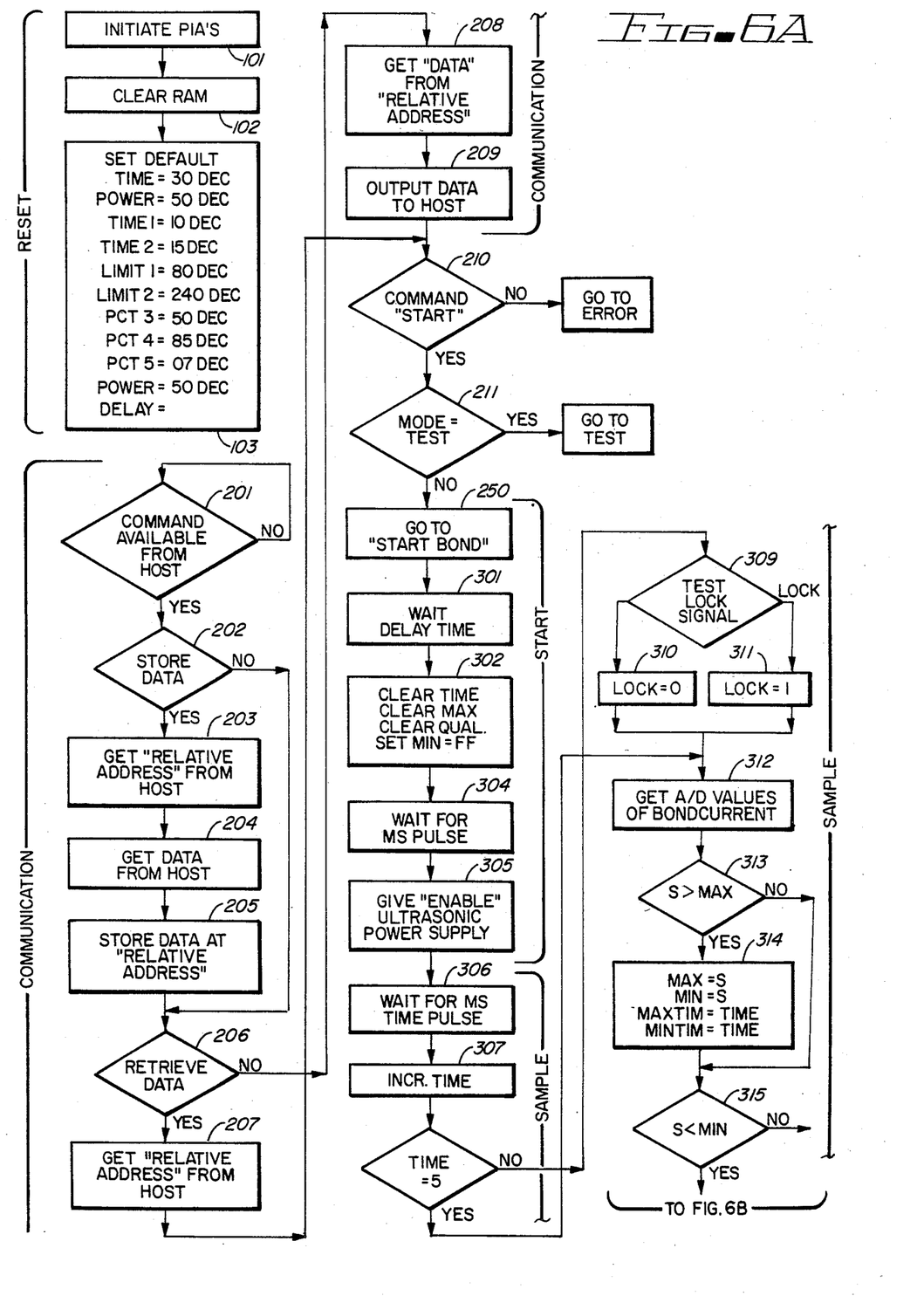
FIG. 6 is a flow diagram of the operations involved in testing the quality of the bond produced by the transducer according to the present invention.
Figure 6B:
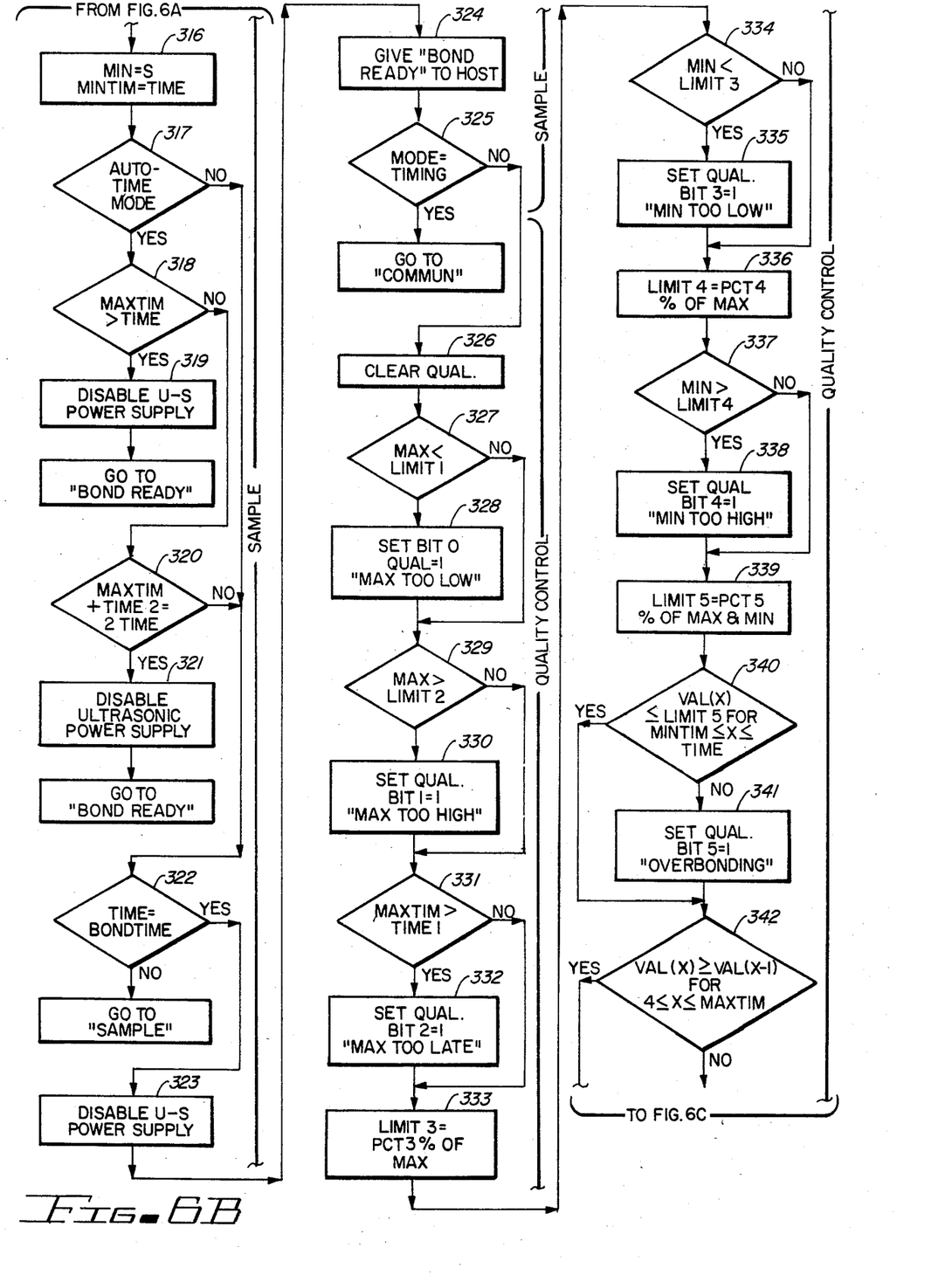
Figure 6C:
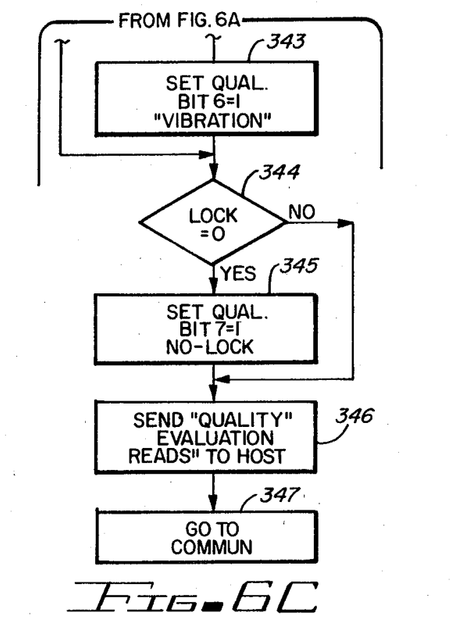

Referring to FIG. 6, a detailed flow diagram for operation of the bond quality control apparatus is shown. The process steps are categorized for convenient referral. The process steps can be understood with reference to terms defined in the specification.

OPERATION OF THE PREFERRED EMBODIMENT

In the bonding apparatus, the bond horn and the bonding wedge are excited mechanically by a piezoelectric crystal oscillator. In the piezoelectric transducer, the driving force is equivalent to the applied driving voltage. The amplitude of the mechanical oscillation of the crystal is proportional to the driving current.

In the preferred embodiment, the transducer is driven by a constant voltage ultra-sonic power supply. During the bonding process, the transducer current varies in a way that is a function of the bond quality. The variation of the bond current (rectified and filtered) provides the bonding curves. The output signal from the (low-pass) filter is sampled in real time by analog to digital convert 15 (or with associated circuitry element 45).

The sampled values are stored in the bond quality control central processing unit (i.e. microprocessor) in the random-access memory. The bonding curve is then analyzed by the internal program. If a faulty bond is detected, then the host central processing unit will be notified. The entire bonding curve can be communicated to the host central processing unit and can be used during the machine set-up for determining correct bonding power, bonding time and hand force.

The general shape of the bonding curve can be understood in the following manner. Immediately after start of the bonding cycle, the bonding current will be low because the mass of the horn is not yet in vibration. The bonding current rises during a certain time and the levels off of the bonding wedge is not hindered into motion. The bond does not take place instantaneously, but the bonding curve rises to a relatively high value. From the moment that the bond starts to form, the wedgetop will be hindered in its motion. The amplitude of the vibrations, the bonding current and the bonding curve will fall to some relative minimum. As will be clear, the bonding curve is dependent on the type of bond horn and on the power supply characteristics.

The bond quality control unit monitors the shape of the bonding curve. The following threshold values in the bonding curve may not be passed, otherwise an error warning will be issued (of FIG. 2). The maximum in the bonding curve may not be lower than LIMIT-1. The maximum in the bonding curve may not be higher than LIMIT-2. The maximum in the bonding curve has to occur before TIME-1. The relative minimum in the bonding curve after the maximum has been reached may not be lower than LIMIT-3. After reaching the relative minimum in the bonding curve the bonding curve may not rise by more than LIMIT-5. After start of the bonding process until the maximum is reached, every sampled value from the bonding curve has to be higher than the previous one. A failure in the ultra-sonic power supply itself is indicated by a "no-lock" signal from its lock-in amplifier. The values for LIMIT-3, LIMIT-4 and LIMIT-5 are calculated by the bond quality controller after the bonding curve has been sampled. These treshold values are calculated as a percentage (PCT3, PCT4 and PCT5 respectively) of the maximum value. After completion of the bonding the analyzation of the bonding data by the bond quality control unit takes less than 20 ms in the preferred embodiment. The conditions are stored in the QUALI register of the bond quality controller central processing unit to the host central processing unit. Table I indicates how the bit postions of the QUALI register are determined.

TABLE I
CONTENTS OF THE QUALI REGISTER

BIT 0=1  MAX<LIMIT 1
BIT 1=1  MAX>LIMIT 2
BIT 2=1  MAXTIM>TIM 1
BIT 3=1  MIN<LIMIT 3=PERCENT 3 OF MAX
BIT 4=1  MIN>LIMIT 4=PERCENT 4 OF MAX
BIT 5=1  VAL (x)≦LIMIT 5=PERCENT 5 OF MAX + MIN
         FOR MINTIM ≦ X ≦TIME
BIT 6=1  VAL (x) ≧VAL (x-1) For 4≦x≦MAXTIM
BIT 7=1  LOCK =∅

The bond quality controller controls the bonding power and bonding time. The bond power is set by the bond quality controller using a digital to analog converter 14. The analog output from the DAC 14 is coupled to the power input on the ultrasonic power supply.

The bond will be started when the host computer sends the "START" command to the bond quality controller data processing unit. The bond quality controller will then operate in the mode number that is previously entered in RAM-location MODE of the bond quality control data processing unit.

The host data processing unit can store the bonding power in RAM-location POWER of the bond quality control data processing unit. The bond time has to be stored in location BNDTIM.

After system RESET certain default values are entered in the bond quality control unit for POWER, BNDTIM, TIME1, TIME2, LIMIT-1, LIMIT-2, PCT3, PCT4 and PCT5. After RESET the system is in TIMING MODE, where it only performs a timing function. The host enters TIME and POWER in bond quality controller data processing unit 11. If the bond quality control unit is used in the CONTROL MODE with the default values entered, the system can detect major bonding problems. For instance, a broken bonding wire will be detected.

If one wants tighter control of the bonding parameters the default values can be changed so that the bond quality control data processing unit passes only bonds with a very specific bonding curve. For instance, LIMIT-1 and LIMIT-2 can be set very close to the maximum of a bonding curve found during set-up. These parameters have to be adjusted under host data processing unit direction.

In the AUTO-TIMING MODE the bond quality control unit aborts the bonding process TIME2 ms after the maximum in the bonding curve has been observed. This option increases bondrepeatibility because the real bonding process itself starts when the bonding surfaces are clean and the wire starts to stick to the substrate. This is the time that the bonding curve reaches its maximum.

A delay time may be inserted before the bond process starts by entering the delay time (ms) in RAM-location DELAY of the bond quality control data processing unit. DELAY=0 by default.

After the bond is ready the bond quality control unit sends a "BOND READY" message to the host data processing unit. Then the bond quality control data processing unit starts to analyze the bond curve and sends a "BOND READY" message to the host data processing unit. Then the bond quality control data processing unit starts to analyze the bond curve and sends a "ANALYZATION READY" message to the host data processing unit.

The host data processing unit may analyze the bond quality information by examining the respective bits of RAM-location QUALI in the bond quality control unit.

TABLE II
RAM REGISTERS FOR BOND QUALITY CONTROLLED DATA PROCESSING UNIT

| | |
|---|---|
| BNDTIME | maximum bond time for the next bond |
| DELAY | delay time before bond will start |
| LOCK | lock-in test result U.S. power supply |
| MAX | value of bond current at maximum of bond curve |
| MAXTIM | time of occurence maximum |
| MIN | value of bond current at minimum in bond curve |
| MINTIM | time of occurence minimum |
| MODE | code for mode of operation |
| LIMIT1 | <MAX |
| LIMIT2 | >MAX |
| LIMIT3 | PCT3 % of MAX |
| LIMIT4 | PCT4 % of MAX |
| LIMIT5 | PCT5 % of MAX |
| POWER | value of power setting for next bond |
| QUALI | this register contains bond quality code |
| S | temporary storage of sample value |
| TIME | time elapsed since start of bond |
| TIME1 | max has to occur before TIME1 |
| TIME2 | in auto-time mode bond will stop $\overline{TIME2}$ after MAXTIM. |
| TEST | contains result code of diagnostics routine |
| VAL(1) -VAL(100) | used for storing sample values bond current |
| SCRTCH(1) -SCRTCH(4) | can be used as scratch pad during calculations |

The bond quality control unit can operate in four modes. In the timing mode the bond quality controller is only used as a timer and interface to DAC for setting the power level. The host computer has to enter power level and bond time in bond quality control RAM. There may be an optional delay. The host then sends a "START" command to the bond quality controller. When the bond is ready, the BQC sends the "BOND READY" message to the host. The quality analysis is not done, so the message "QUALITY ANALYSIS READY" will not appear. In the control mode, the bond quality control unit is used as a timer and interface to DAC for setting the power level. The BQC also analysis the bond quality after the bond is ready. Host enters POWER, BNDTIM and optionally DELAY in BQC. The host may optionally enter different values for TIME1, LIMIT-1, LIMIT-2, PCT3, PCT4 and PCT5 if default values are not to be used. Host then gives "START" command to BQC. After the bond is ready the BQC sends the "BOND READY" messsage to the host and when the bond data analyzation is ready, the "BOND ANALYZATION READY" message is sent to the host. The host can then examine the QUALI register. If QUALI=0 the bond is acceptable. In the auto-timing mode, this mode is the same as control mode with the difference that the bond quality control unit will stop the bonding when TIME2 has elapsed since the maximum in the curve occurred. The bond is aborted prematurely if the maximum in the bond curve occurs later than TIME1. In the diagnostic mode, after the "START" command has been issued by the host, the bond quality control unit runs a number of diagnostic routines. The result of the routines is stored in TEST register. After the routine is finished the bond quality control unit sends the "DIAGNOSTICS READY" message to the host.

The host computer communicates with the bond quality-control unit through two PIA's as indicated in FIG. 4. A handshake protocol is used for the communication. Host and bond quality control unit uses the A port of their PIA as output port and the B port of their PIA as input port. CA1 high of the sending data processing unit is sign for the receiving data processing unit that data is available. The receiving data processing unit then takes the data from its B port and sets its CB2 high. This is a sign for the sending data processing unit that the data has been received. The sending MPU CLEARS its CA2 line where upon the receiving station clears its CB1.

The host data processing unit can examine all RAM-registers in use for the bond quality control data processing unit. These RAM-registers must then be addressed relative to the first RAM-register in use (see TAble II of RAM-registers in use for bond quality control). The relative address is an 8 bit word. The host computer can send a: retrieve data command to the bond quality control unit through the PIA's, followed by a relative address indicating where the requested data has to come from. The bond quality control data processing unit will now send the data to the host data processing unit. With the "RETRIEVE DATA" command the host data processing unit can examine all variables in the bond quality control data processing unit. For instance, it can be used to display the bond curve on a T.V. monitor by successively calling all the bond current sampling value.

The host can change the value of the variables in bond quality RAM by using the STORE DATA command. In this case the host sends the STORE DATA command to data processing unit followed by the relative address where the data has to be stored and finally the data themselves.

Another command the host can send to the bond quality control unit data processing unit is the start command. The bond quality control data processing unit now starts to operate in the mode stored in RAM-location MODE. When a bond is ready the bond quality control data processing unit sends a BOND READY message to the host data processing unit. If the bond quality controller is in the CONTROL or AUTO-TIME mode the bond quality control data processing unit will send a ANALYZATION READY message to the host data processing unit. After it is finished with the bonding curve analyzation, the QUALI register is filled with the appropriate code.

The envelope detector 16 is comprised of a pre-amplifier, a full-wave rectifier, a low-pass filter (i.e. the transducer current will typically be 60 khz) and amplifier. The signal from this circuit is applied to an analog-to-digital converter which should have a conversion time of less than 100 us. The analog to digital conversion begins when CB2 connected to the $\overline{WR}$ pin on the ADC 0804 becomes high binary value. The conversion is ready when CB1, connected to the $\overline{INTK}$ pin goes from high to low binary value. After that CB2 has to return to a low binary value to make A/D converter 15 ready for a new conversion.

The above description is given by way of example only. Changes in form and details may be made by one skilled in the art without departing from the spirit and scope of the invention as defined by the appended claims.

What is claimed is:

1. The method of determining if the bond produced by an ultrasonic transducer during a bonding operation is acceptable, comprising the steps of:
   (a) identifying expected parameters of a current driving said ultrasonic transducer which produces an acceptable bond, comprising the steps of:
      (i) providing a pre-established range for a maximum current value,
      (ii) providing a pre-established range for a relative minimum current value occurring following said maximum current value, and
      (iii) providing a pre-established value which said current should exceed following detection of said minimum current value:
   (b) obtaining actual parameters for a current driving said ultrasonic transducer during a bonding operation, comprising the steps of
      (i) obtaining a maximum current value,
      (ii) obtaining a relative minimum current value occurring following said maximum current value, and
      (iii) obtaining a current value for said ultrasonic transducer driving current following said minimum current value;
   (c) comparing said actual and said expected current parameters; and thereafter
   (d) producing a signal when said step of comparing said current parameters indicates a difference between said actual and said expected current values is greater than a predetermined value.

2. The method of determining if a bond produced by an ultrasonic transducer during a bonding operation is acceptable of claim 1 wherein step b includes the steps of:
   (a) producing a signal related to the current driving said ultrasonic transducer;
   (b) rectifying and determining an envelope signal for said related signal;
   (c) applying said envelope signal to an analog-to-digital converter; and
   (d) sampling an output of said analog-to-digital converter.

3. Apparatus for analyzing a lead bond produced by an ultrasonic transducer unit, wherein characteristics of current of said ultrasonic transducer unit forming said bond are compared with a plurality of predetermined current characteristics comprising:
   detection means coupled to said transducer for providing an output signal determined by said current signal driving said transducer;
   envelope means for providing a signal determined by an envelope of said detection means output signals;
   conversion means for converting said envelope signal to a digitalized signal; and
   computer means adapted to sample said digitalized signal, said sampled digitalized signal compared with said predetermined current characteristics, said predetermined current characteristics include a pre-established range for a current maximum, a pre-established range for a current relative minimum and a monotonically increasing current prior to said current maximum, said computer means storing a preselected logic signal when said sampled digitalized signals do not agree with said predetermined characteristics.

4. In association with apparatus for automatically bonding leads by means of an ultrasonic transducer, apparatus for detecting an unacceptable lead bond comprising:

means for storing a plurality of parameters, said parameters defining characteristics of current applied to said transducer during performance of an acceptable bond wherein said parameters include a range of values for a maximum value of said current, a range of values for a relative minimum of said current occurring following said current maximum, and a value which said current should exceed following said relative minimum;

means for detecting a signal produced by transducer current resulting from a bonding operation;

means for producing a rectified envelope signal from said transducer signal detecting means;

means for sampling a digitalized signal porportional to a rectified envelope signal; and means for comparing parameters of said digitalized signal with aid plurality of stored parameters, said comparing means producing a signal indicating when said comparison is not within acceptable limits.

5. In association with apparatus, for automatic lead bonding, apparatus for detecting bonding operations outside of pre-selected limits comprising:

means for generating a signal determined by current driving said bonding apparatus;

means for generating a bond current signal from said signal generating means;

means for determining characteristics, of said bond current signal;

means for determining when said bond current signal is outside of said pre-selected limits, said pre-selected limits include a range of values for a maximum current, a range of values for a current relative minimum following said current maximum, and a minimum value for said current after a preestablished time period following said relative minimum; and register means for storing a predetermined logic signal when said bonding operations are outside of each of said pre-selected limits.

* * * * *